US010205761B2

(12) United States Patent
DiMattia et al.

(10) Patent No.: US 10,205,761 B2
(45) Date of Patent: Feb. 12, 2019

(54) FORWARD ERROR CORRECTION RECOVERY AND RECONSTRUCTION

(71) Applicant: Verizon Patent and Licensing Inc., Arlington, VA (US)

(72) Inventors: James F. DiMattia, Easton, PA (US); Sankar Subramanian, Ossining, NY (US); Johannes P. Schmidt, Los Altos Hills, CA (US)

(73) Assignee: Verizon Patent and Licensing, Inc., Basking Ridge, NJ (US)

( * ) Notice: Subject to any disclaimer, the term of this patent is extended or adjusted under 35 U.S.C. 154(b) by 46 days.

(21) Appl. No.: 15/391,262

(22) Filed: Dec. 27, 2016

(65) Prior Publication Data

US 2018/0131466 A1    May 10, 2018

Related U.S. Application Data

(60) Provisional application No. 62/417,470, filed on Nov. 4, 2016.

(51) Int. Cl.

| | | |
|---|---|---|
| *H04L 29/06* | (2006.01) | |
| *H04L 1/00* | (2006.01) | |
| *H04L 29/08* | (2006.01) | |
| *H04L 12/18* | (2006.01) | |

(52) U.S. Cl.
CPC ........ *H04L 65/4076* (2013.01); *H04L 1/0045* (2013.01); *H04L 12/1881* (2013.01); *H04L 65/607* (2013.01); *H04L 67/02* (2013.01)

(58) Field of Classification Search
CPC ..... H04L 12/18; H04L 1/0045; H04L 1/0046; H04L 67/02; H04L 65/607; H04L 65/4076
See application file for complete search history.

(56) References Cited

PUBLICATIONS

Anthony Vetro, The MPEG-DASH standard for multimedia streaming over the internet, IEEE, pp. 62 to 67. (Year: 2011).*
Chang et al., Adaptive streaming scheme for MPEG-DASH over WiFi multicast, IEEE pp. 168-173. (Year: 2013).*
Chang et al., An inter-layer protection scheme with block based interleaving for MPEG-DASH over WiFi Multicast, IEEE, pp. 1 to 5. (Year: 2014).*

* cited by examiner

*Primary Examiner* — Shelly A Chase

(57) ABSTRACT

A method, a system, and a non-transitory storage medium provides to receive multicast protocol packets, wherein each of the multicast protocol packets includes one of a slice of program data of a Moving Picture Experts Group (MPEG) Dynamic Adaptive Streaming over Hypertext Transfer Protocol (HTTP) (MPEG-DASH) segment and a header of the slice that indicates sequence information of the slice relative to other slices, or forward error correction data; order, in response to the receipt of the multicast protocol packets, each slice received based on the sequence information; determine whether any slice is missing that is a part of the MPEG-DASH segment; determine, in response to a determination that there are missing slices, whether the missing slices can be recovered; and use, in response to a determination that the missing slices can be recovered, the forward error correction data to recover the missing slices.

20 Claims, 16 Drawing Sheets

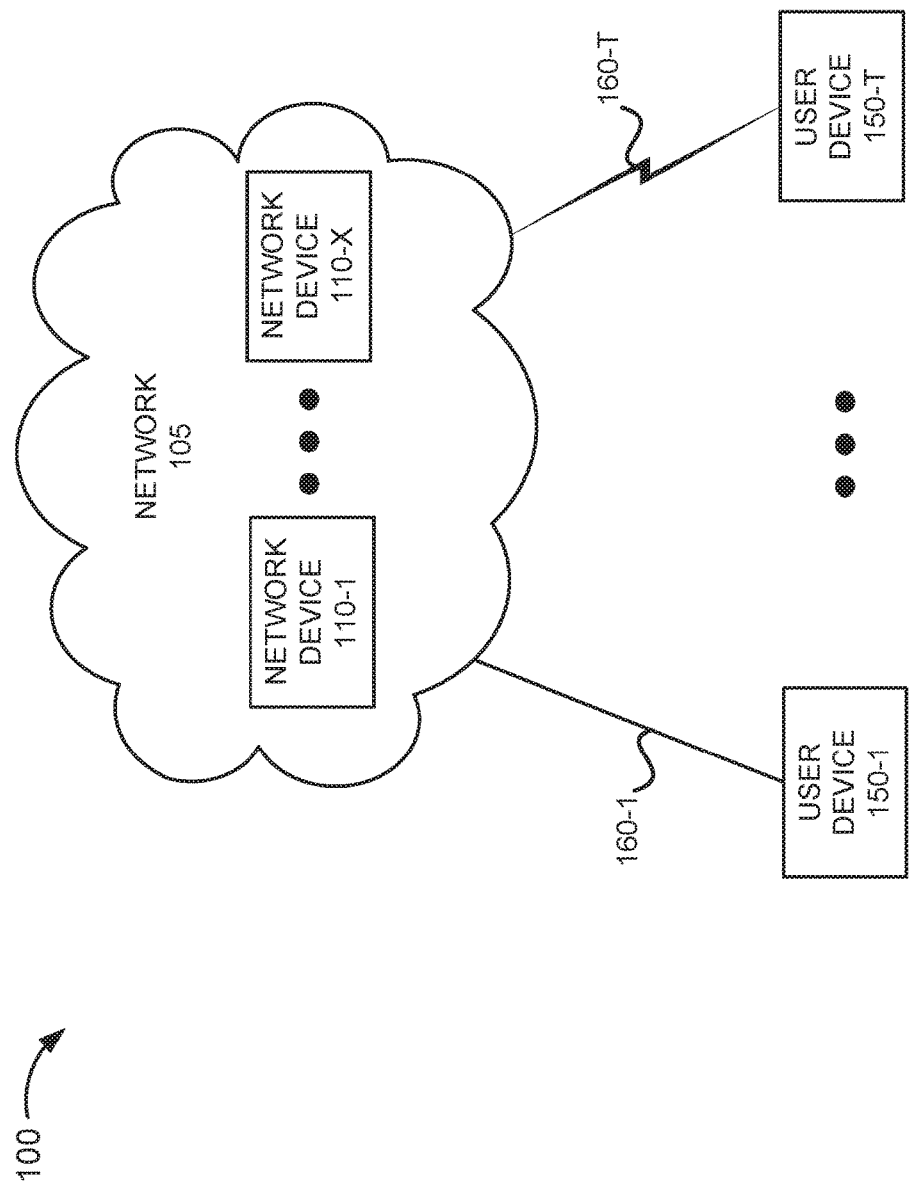

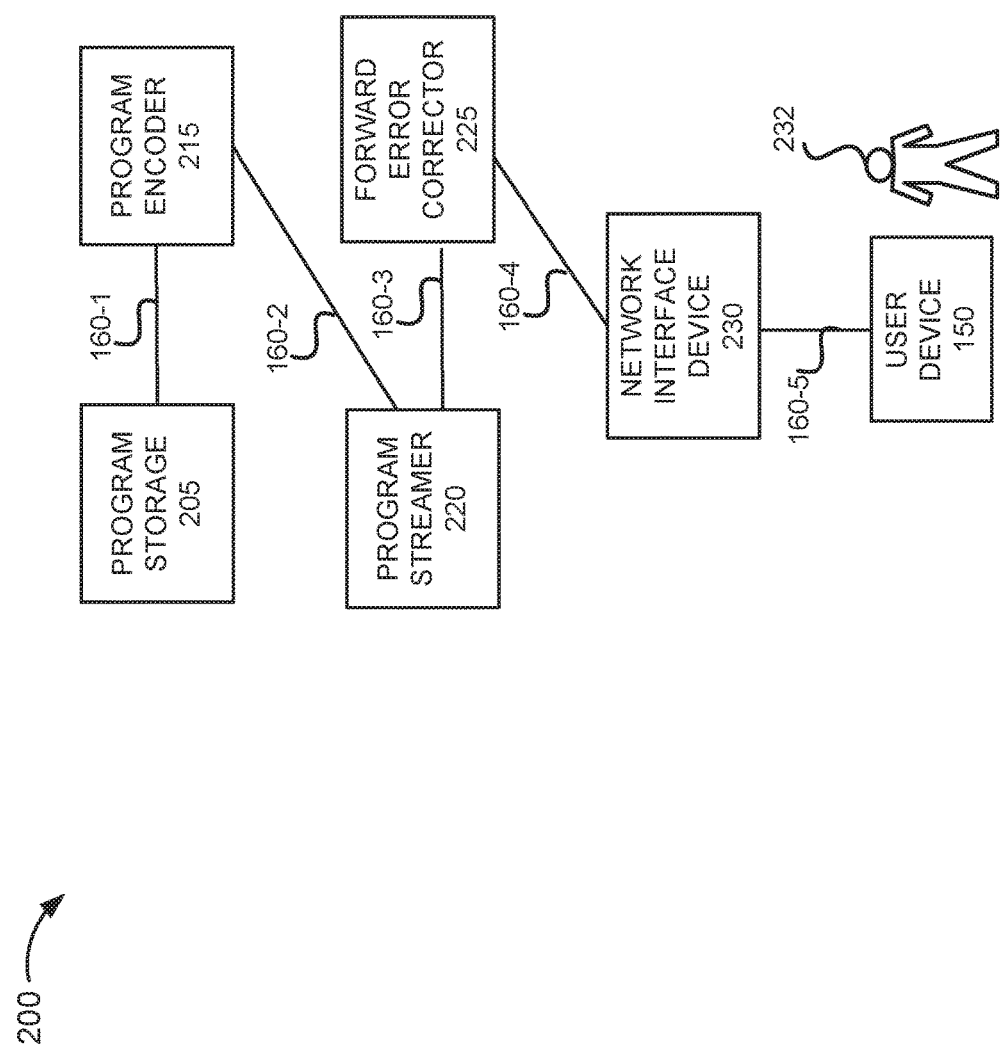

FORWARD ERROR CORRECTION RECOVERY AND RECONSTRUCTION

RELATED APPLICATION

This application claims priority under 35 U.S.C. § 119 based on U.S. Provisional Patent Application No. 62/417,470 filed Nov. 4, 2016, the disclosure of which is incorporated by reference herein in its entirety.

BACKGROUND

The Moving Picture Experts Group (MPEG) Dynamic Adaptive Streaming over Hypertext Transfer Protocol (HTTP) (MPEG-DASH) standard provides a set of HTTP adaptive bitrate streaming features, such as codec agnostic support, frame-synchronized adaptive bitrate switching, and support for multiple manifest formats for video-on-demand (VoD) and live streaming.

In the delivery of data, such as program data of a multicast transmission, forward error correction (FEC) may be used. At the user device-side, the forward error correction data can be used to correct errors resulting in fewer retransmissions. While various forward error correction algorithms are available for use, developers are continually striving to maximize their efficiency.

BRIEF DESCRIPTION OF THE DRAWINGS

FIG. 1A is a diagram illustrating an exemplary environment in which an exemplary embodiment of a forward error correction service may be implemented;

FIG. 2A is a diagram illustrating exemplary network elements that provide an exemplary embodiment of the multicast service;

DETAILED DESCRIPTION OF PREFERRED EMBODIMENTS

Figure 1B:
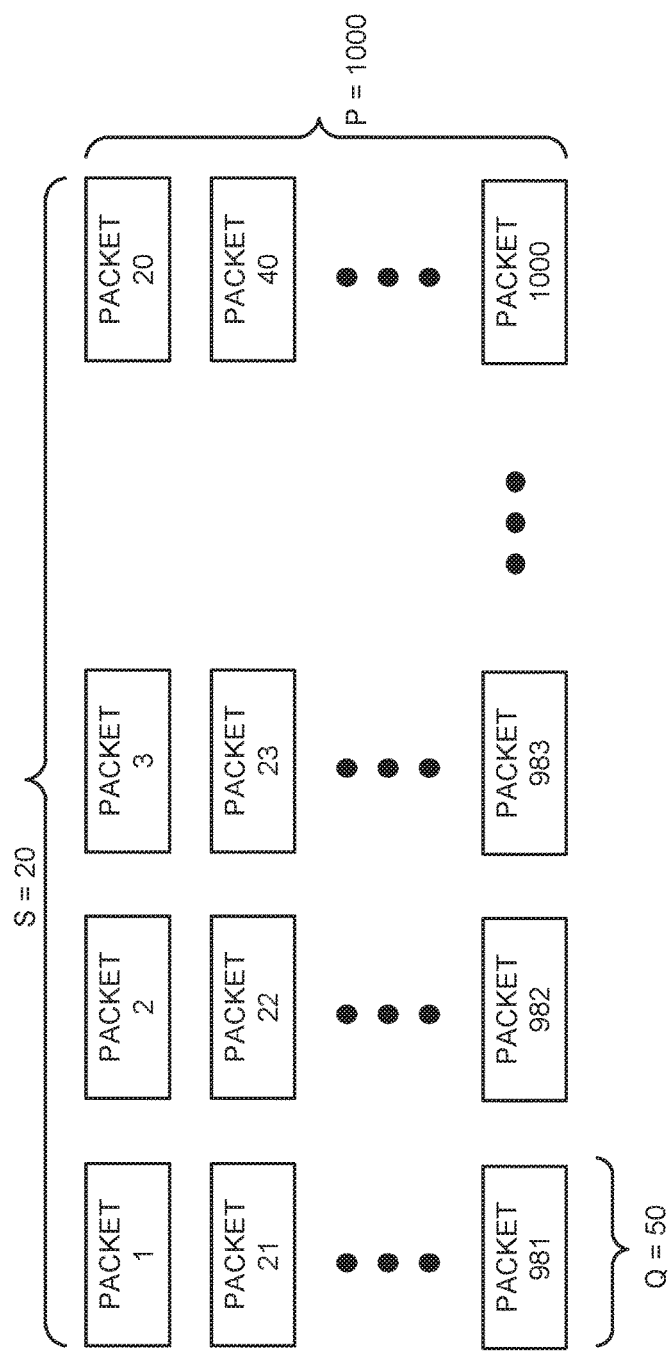
FIGS. 1B and 1C are diagrams pertaining to the forward error correction service included in a multicast service.

The following detailed description refers to the accompanying drawings. The same reference numbers in different drawings may identify the same or similar elements. Also, the following detailed description does not limit the invention.

MPEG-DASH is based on Media File Format standard International Organization for Standardization (ISO)/International Electromechanical Commission (IEC) 23009-1: 2014. Normally, MPEG-DASH uses HTTP because HTTP is stateless, firewall friendly, does not require a continuous connection with a streaming server, and can provide HTTP caching mechanisms.

The term "program" as used herein, is intended to include audio data and/or visual data. For example, the program may be implemented as television content, Internet content, user content, or other form of audio and/or video media. By way of further example, the program may be a movie, a television show, a sports event, video-on-demand (VoD) content, live content, pre-recorded content, premium channel content, pay-per-view content, a music event, a podcast, a videocast, a webcast, or a news event.

According to exemplary embodiments, a forward error correction service is provided. According to an exemplary embodiment, a network element of a network includes logic that provides the forward error correction service. According to an exemplary implementation, the forward error correction service may be implemented as a part of the preparation and multicast delivery of a program during a multicast to user devices. According to other exemplary implementations, the forward error correction service may be implemented as a part of the preparation and delivery of other types of data from a source device to a destination device.

According to an exemplary embodiment, a multicast service generates MPEG-DASH segments. The MPEG-DASH segments may include multiple adaptive bit rates of a program. According to an exemplary embodiment, the multicast service segments the MPEG-DASH segments into numerous slices in which a header is added to each slice. For example, a single MPEG-DASH segment may be divided into one thousand slices or other numerical division. By way of further example, the MPEG-DASH segment may correspond to a 2-second segment of the program, and each slice may correspond to a fraction of the time of the 2 seconds. According to an exemplary embodiment, each header for each slice includes sequence information. The header may be carried with slice in the payload of a protocol packet. In this regard, the header is a data instance that is separate and distinct from a header of a protocol packet (e.g., an Internet Protocol (IP) header, a User Datagram Protocol (UDP) header, etc.). For purposes of description, the term "packet" is used to refer to the slice and the header.

The packet may be loaded into another container for subsequent multicast transmission. According to an exemplary embodiment, the packets may be loaded into UDP packets, IP packets, or other type of packets of a protocol suitable for multicast transmission. This is in contrast to, for example, using protocol packets, such as Hypertext Transfer Protocol (HTTP), Transmission Control Protocol (TCP), etc., to transport program data, since these protocols are not suitable for multicast transmission. Depending on the byte size of each packet relative to the byte size of the protocol packet (e.g., payload size), the protocol packet may include one or multiple packets. According to an exemplary implementation, the byte size of the packet may be such that a UDP packet may carry at least one packet (e.g., a slice and a header) without the need for fragmentation. The multicast service transmits the packets downstream toward user devices of a multicast.

According to an exemplary embodiment, the multicast service receives the packets and rearranges any packets received out of order into a correct order. For example, the multicast service uses the sequence information included in the headers to determine the correct ordering of the slices and the packets including such slices. According to an exemplary embodiment, the multicast service identifies any missing slices of the MPEG-DASH segments and obtains the missing slices. For example, the multicast service uses the sequence information included in the headers to determine whether any slices are missing. According to an exemplary implementation, the multicast service obtains the missing slice from a streaming device that is multicasting the program. The streaming device may transmit the missing slice via a unicast delivery method.

According to an exemplary embodiment, after the MPEG-DASH segments are reassembled and error detection and correction is performed, the MPEG-DASH segments are temporarily stored. A forward error correction service on the MPEG-DASH segments, as described herein, is performed. According to an exemplary embodiment, the forward error correction service divides the packets into stripes or sub-groups of packets in which each sub-group includes packets that are not consecutively sequenced. For example, a stripe of packets may include packet #1, packet #11, etc., while another group may include packet #2, packet #12, and so forth. This is in contrast to a stripe of packets including packet #1, packet #2, packet #3, etc. According to an exemplary embodiment, a forward error correction service generates forward error correction (FEC) packets for each stripe. For purposes of description, the term "stripe" is used to describe a sub-group of packets.

According to an exemplary embodiment, after the forward error correction service is performed on the packets, the multicast service transmits the packets in order (e.g., packet #1, packet #2, etc.) followed by the forward error correction (FEC) packets (e.g., FEC packet #1, FEC packet #2, etc). The packets (e.g., the program packets and the FEC packets) are delivered via a multicast protocol to user devices of the multicast.

According to exemplary embodiments, a user device includes logic that provides the forward error correction service. According to an exemplary implementation, the forward error correction service may be implemented as a part of the receipt and recovery of a program during a multicast of the program to the user device. According to other exemplary implementations, the forward error correction service may be implemented as a part of the receipt and recovery of other types of data from a source device to a destination device (e.g., the user device). According to an exemplary embodiment, the forward error correction service includes determining whether the protocol packet includes any errors. When it is determined that the protocol packet includes an error, the user device attempts to obtain the protocol packet via a retransmission. When the protocol packet cannot be recovered or obtained, the forward error correction service discards the protocol packet that includes the error.

According to an exemplary embodiment, the forward error correction service arranges the slices in sequential order based on the sequence information included in the headers. According to an exemplary embodiment, the forward error correction service removes the headers subsequent to the sequential ordering. According to an exemplary embodiment, the forward error correction service determines whether there are any missing slices for each stripe. According to an exemplary embodiment, when it is determined that there is a missing slice from a stripe, the forward error correction service determines whether the missing slice can be recovered. According to an exemplary embodiment, the forward error correction service determines whether the missing slice can be recovered based on the number of missing slices relative to the number of FEC packets. For example, when the number of missing slices in a stripe is larger than the number of FEC packets of the stripe, the forward error correction service determines that the missing slices cannot be recovered. By way of further example, when a stripe is missing six slices and there are five FEC packets pertaining to the stripe, the forward error correction service determines that the six missing slices cannot be recovered. However, when the number of missing slices is equal to or less than the number of FEC packets, the forward error correction service determines that the missing slices can be recovered.

According to an exemplary embodiment, when any stripe includes missing slices that cannot be recovered, the forward error correction service determines that the MPEG-DASH segment is not recoverable, and the MPEG-DASH segment is dropped (e.g., all stripes associated with the division of the MPEG-DASH segment). However, when all missing slices of the MPEG-DASH segment can be recovered (assuming any stripe has missing slices), the forward error correction service determines that the MPEG-DASH segment is recoverable.

According to an exemplary embodiment, the forward error correction service uses the FEC packets, on a per stripe basis, to recover any missing slices. According to an exemplary embodiment, the forward error correction service uses a number of FEC packets that corresponds to the number of missing slices. For example, when the stripe includes 2 missing slices, the forward error correction service selects 2 FEC packets belonging to the stripe to recover the 2 missing slices. According to an exemplary embodiment, when the number of available FEC packets of the stripe is greater than the number of missing slices of the stripe, the forward error correction service may select any of the FEC packets of the stripe so long as the number of FEC packets is equal to the number of missing slices. For example, when the stripe includes 2 missing slices, but the stripe includes 7 FEC packets, the forward error correction service may select any 2 of the available 7 FEC packets to recover the 2 missing slices. An FEC packet of the stripe may be able to recover any missing slice of the stripe.

According to an exemplary embodiment, when it is determined that there are no missing slices from any of the stripes, the forward error correction service determines that no missing slices need to be recovered. According to an exemplary embodiment, subsequent to the recovery of missing slices or when no missing slices are present, the forward error correction service verifies the data integrity of the MPEG-DASH segment. According to an exemplary embodiment, the forward error correction service forwards the MPEG-DASH segment to the program player.

FIG. 1A is a diagram illustrating an exemplary environment 100 in which an exemplary embodiment of a forward error correction service may be implemented. As illustrated, environment 100 includes a network 105. Network 105 includes network devices 110-1 through 110-X, in which X>1 (also referred to as network devices 110 and, individually and generally as network device 110). Additionally, environment 100 includes user devices 150-1 through 150-T, in which T>1 (also referred to as user devices 150 and, individually and generally as user device 150). As further illustrated, environment 100 includes communication links 160-1 through 160-T, (also referred to collectively as links 160 and, individually and generally as link 160).

The number of network devices, the number of user devices, the number of networks, and the arrangement in environment 100 are exemplary. According to other embodiments, environment 100 may include additional network devices, fewer network devices, and/or differently arranged network devices, than those illustrated in FIG. 1A. Additionally, or alternatively, environment 100 may include additional networks, fewer networks, and/or arrangement that is/are different from that illustrated in FIG. 1A. For example, user device 150 may be a device of a local area network (LAN). Additionally, the number of links 160, the type of links 160 (e.g., wired, wireless, etc.), and the arrangement of links 160 illustrated in environment 100 are exemplary. For example, although not illustrated, links 160 exist between network devices 110 included in network 105.

A network device may be implemented according to a centralized computing architecture, a distributed computing architecture, or a cloud computing architecture (e.g., an elastic cloud, a private cloud, a public cloud, etc.). Additionally, a network device may be implemented according to one or multiple network architectures (e.g., a client device, a server device, a peer device, a proxy device, and/or a cloud device).

A communication connection between network devices 110 and between user device 150 and network device 110 may be direct or indirect via link 160. For example, an indirect communication connection may involve an intermediary network device, another user device, and/or an intermediary network not illustrated in FIG. 1A.

Network 105 includes one or multiple networks of one or multiple types. Network 105 may be implemented as a satellite-based network, a terrestrial-based network, or a combination thereof. Network 105 may be implemented to include a television distribution network, a mobile network, a program streaming network, or other suitable network (e.g., the Internet, etc.) for providing programs. Network 105 may be implemented to multicast programs using various technologies, such as an optical architecture, a coaxial cable architecture, an Internet Protocol (IP) TV architecture, a digital subscriber line (DSL) architecture, a wireless architecture, an Internet-based architecture, a program streaming architecture, or some combination thereof. Depending on the architecture implemented, network 105 may include super headend (SHE) devices, video hub office (VHO) devices, and video serving office (VSO) devices. Network 105 may include other types of devices, such as, for example, billing devices, security devices, customer profile devices, interactive programming guide devices, load balancer devices, and various types of program distribution devices (e.g., routers, gateway devices, repeater devices, splitter devices, passive optical network (PON) devices, etc.).

Network devices 110 include logic that prepares and delivers programs to user devices according to the multicast service described herein. According to an exemplary implementation, network devices 110 include logic that encodes a program, streams the program, reassembles the program, packages the program with forward error correction, and provides the program with forward error correction to user devices. According to an exemplary embodiment, network devices 110 include logic that further segments MPEG-DASH segments into numerous slices. According to an exemplary embodiment, network devices 110 include logic that generates a header for each slice. The header includes sequence information pertaining to the slice. According to an exemplary embodiment, network devices 110 include logic that places the packets in protocol packets that are suitable for multicast transmission. According to an exemplary implementation, the protocol packets are UDP packets. According to an exemplary embodiment, network devices 110 include logic that multicasts the protocol packets toward user devices 150.

According to an exemplary embodiment, network devices 110 include logic that divides the packets into stripes of packets in which each stripe includes packets that are not consecutively sequenced. For each stripe, network devices 110 include logic that generates forward error correction (FEC) packets. According to an exemplary embodiment, network devices 110 include logic that transmits the packets in sequence followed by the FEC packets to user devices 150 of the multicast.

According to an exemplary embodiment, network devices 110 include a mass storage device that stores programs. The programs may be stored in various resolutions, bitrates, compressions, encodings/decodings, frame rates, aspect ratios, languages, sample rates, and so forth. The programs may be played on various players of user devices 150 according to various player languages, formats, etc.

According to an exemplary embodiment, network devices 110 include an encoder device that includes logic that encodes the programs. According to an exemplary implementation, the encoder device includes logic that generates MPEG-DASH segments of the program. For example, the MPEG-DASH segments may include files having multiple adaptive bit rates of the program. According to an exemplary implementation, the encoder device includes logic that generates MPEG-DASH content. The MPEG-DASH content includes the Media Presentation Description (MPD), which describes a manifest of the available program, all of its various alternatives and the Uniform Resource Locator (URLs). In addition, there are the program segments, which contain the actual audio/video streams, chunked into playable segments (e.g., MPEG-DASH segments). To play the program, the DASH client first retrieves the MPD. By parsing the MPD, the DASH client learns about the program timing, program location (e.g., the URL), resolutions, minimum and maximum bandwidths, required digital rights management (DRM) and Forward Error Correction rules. Using the MPD information, the DASH client selects the appropriate bit rate and starts streaming the program. The encoder device may be implemented as a network computer.

According to an exemplary embodiment, network devices 110 include a streaming device that includes logic to stream the program to user devices 150. According to an exemplary implementation, the streaming device includes logic to multicast the program. The streaming device may also include logic to broadcast and/or unicast the program. According to an exemplary implementation, the streaming device includes logic that divides the MPEG-DASH segment into multiple slices and adds a header to each slice. According to an exemplary implementation, the header includes sequence information (e.g., a sequence number) so that a correct ordering of the slices may be managed. The header may also include an identifier or sequence information pertaining to the MPEG-DASH segment to which the slice belongs. Also, the header may include an identifier of the program. In this regard, as previously described, the header is a data instance that is separate and distinct from a header of a protocol packet.

The streaming device includes logic that places the packets (e.g., the slices and the headers) in protocol packets that are suitable for multicast transmission. According to an exemplary implementation, the protocol packets are UDP packets. The streaming device includes logic that generates the Multicast headers (e.g., UDP headers) for the protocol packets (e.g., the UDP packets). The streaming device includes logic that streams the protocol packets, which include the packets, towards user devices 150. The streaming device may be implemented as a network computer, a web server, an application server, a streaming server, an origin server, a media server, a video server, or other type of streaming server device.

According to an exemplary implementation, the encoder device or the streaming device may transmit packets with forward error correction and/or another type of communication-related service (e.g., encryption, etc.). However, the forward error correction is different than the forward error correction used by the forward error correction device, as described herein. For example, the forward error correction used by the encoder device or the streaming device may be based on a conventional or well-known forward error correction algorithm.

According to an exemplary embodiment, network devices 110 include a forward error correction device that includes logic to provide the forward correction service as described herein. According to an exemplary embodiment, the forward error correction device includes logic that receives the packets and assembles the slices of the MPEG-DASH segments in consecutive sequential order. According to an exemplary implementation, the forward error correction devices use the headers (e.g., the sequence numbers, etc.) associated with the slices to determine the correct ordering of the slices. According to an exemplary embodiment, the forward error correction device determines whether any slices of the MPEG-DASH segments are missing based on the header (e.g., sequence number, etc.) associated with each slice. The forward error correction device may perform error detection and correction in accordance with forward error correction used upstream. The assembled and error-free MPEG-DASH segments may be temporarily stored before the forward error correction service is performed.

The forward error correction device re-slices the MPEG-DASH segments and places them into packets. The forward error correction device uses the program data included in the packets to generate the FEC packets as described herein. For example, referring to FIG. 1B, assume that a group of 1000 packets (i.e., P=1000) are divided into 20 stripes (i.e., S=20) in which each stripe includes 50 packets (i.e., Q=50).

Figure 1C:
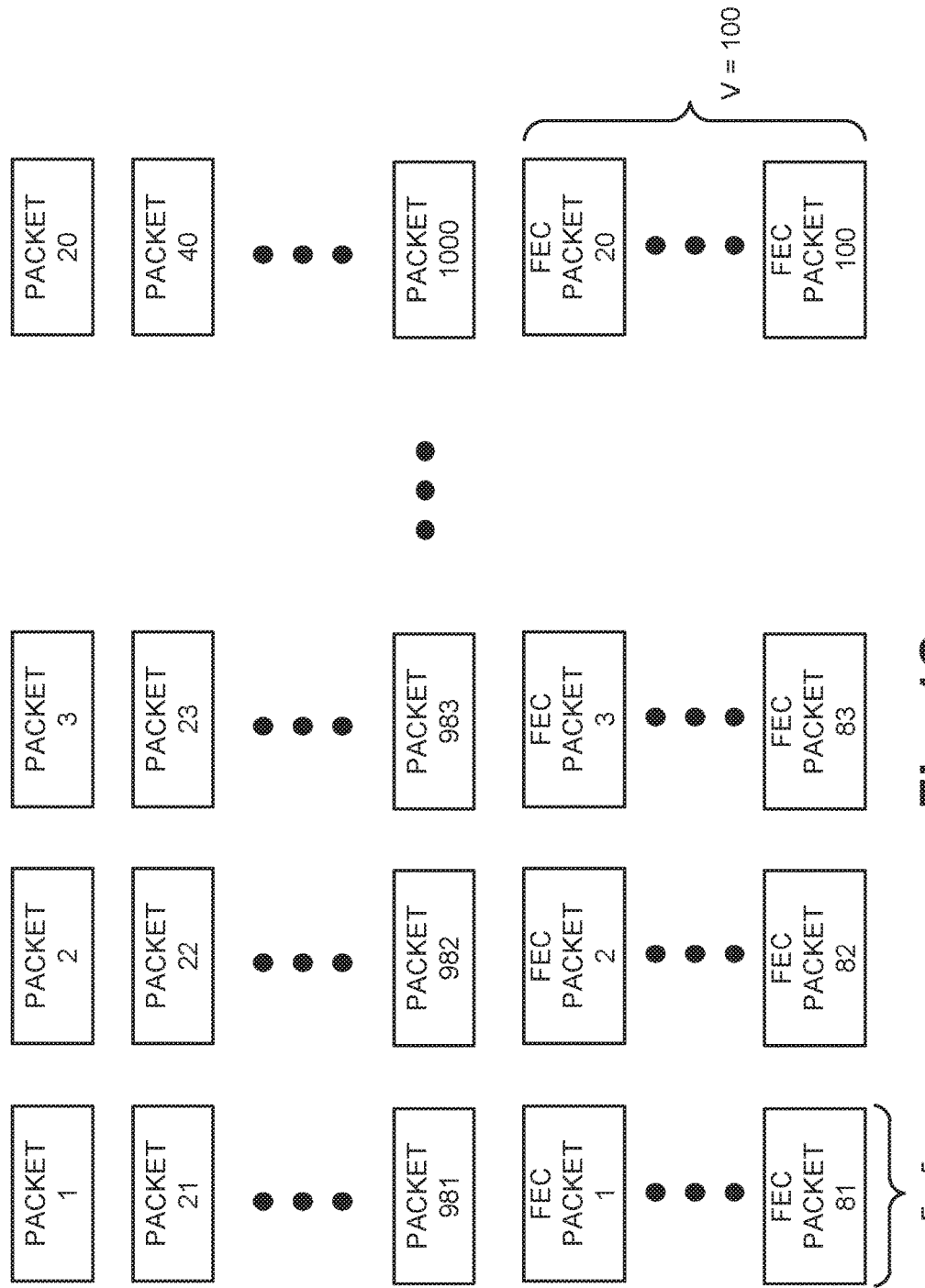

Referring to FIG. 1C, the forward error correction devices uses each stripe as a separate sub-group of packets to derive FEC packets. The forward error correction device may be configured with one or multiple parameters pertaining to the forward error correction service, such as the total number of FEC packets to generate and/or the number of FEC packets to generate for each stripe. In this example, the forward error correction device generates 100 FEC packets (i.e., V=100) in which each stripe includes 5 FEC packets (i.e., F=5). According to this example, the FEC packets provide a 10% overhead (e.g., 100/1000) relative to the 1000 packets. Based on the forward error correction service, each stripe of packets (i.e., Q packets) can tolerate a loss of (F*S) consecutive packets (i.e., 100 consecutive packets).

As previously described, the 5 FEC packets can recover up to 5 missing slices of its stripe. Additionally, each of the 5 FEC packets can recover any of the 50 packets included in the stripe. Additionally, for example, when the number of FEC packets of a stripe is greater than the number of missing slices of the stripe, the forward error correction service may select any of the FEC packets belonging to the stripe so long as the number of FEC packets is equal to the number of missing slices. For example, when the stripe includes 3 missing slices, but the stripe includes 5 FEC packets, the forward error correction service may select any 3 of the available 5 FEC packets belonging to the stripe to recover the 3 missing slices. However, when the number of missing slices in the stripe exceeds the number of FEC packets in the stripe, the stripe may be unrecoverable. The MPEG-DASH segment may also be deemed unrecoverable.

The variables P, S, Q, V, and F and the values associated with these variables as explained in relation to FIGS. 1B and 1C are merely exemplary. According to other embodiments, the variables and/or the values may be different. Additionally, according to other implementations, additional, fewer, and/or different variables may be used. Additionally, or alternatively, according to various implementations, the value of the variable may be static or dynamic. By way of example, the value of the variable may dynamically change based on network state information (e.g., level of congestion, bit error rate, etc.).

The forward error correction device transmits the packets (e.g., packets 1-1000) and then the FEC packets (e.g., packets 1-100) toward user devices 150 of the multicast. The forward error correction device may be implemented as a packet forwarding device. For example, the packet forwarding device may be implemented as a repeater, a router, a gateway, or other type of network computational device.

User device 150 includes a communicative and computational device that can receive data (e.g., program data and forward error correction data) from network devices 110. According to an exemplary embodiment, user device 150 includes logic that provides the forward error correction service, as described herein. User device 150 may be implemented as a mobile device, a portable device, or a stationary device. For example, user device 150 may include a display device (e.g., a television, a smart television, a monitor), a set top box (e.g., a client device, a thin client device, a converter box, a receiver, a tuner, a digibox, an IPTV set top box), a server device (e.g., an in-home media server that includes tuners), a mobile device (e.g., a smartphone, a tablet device, a netbook, a phablet, a personal digital assistant, etc.), an in-vehicle infotainment system, a computer (e.g., a desktop computer, a laptop computer, etc.), or other type of end user device (e.g., a wearable device, an Internet access device, etc.). User device 150 may include a program player that is able to receive and play a program.

Communication link 160 provides a communication path between network 105 and user device 150, and between network device 110 and user device 150. Communication link 160 may have certain characteristics, such as, for example, bandwidth capacity and data rate. Communication link 160 may be implemented to include one or multiple mediums, such as wireless (e.g., radio, microwave, terrestrial, satellite, infrared, etc.) and/or wired (e.g., coaxial cable, optical fiber, copper, etc.).

FIGS. 2A-2F are diagrams illustrating an exemplary process of the multicast service. As illustrated, environment 200 includes a program storage 205, a program encoder 215, a program streamer 220, and a forward error corrector 225. These network elements may be implemented at network devices 110 of network 105 depicted in FIG. 1A. According to other exemplary embodiments, the multicast service may include additional, fewer, and/or different network elements than those illustrated in FIG. 2A and described herein. Additionally, or alternatively, multiple network elements may be combined into a single network element. For example, program encoder 215 and program streamer 220 may be combined into a single network element. Additionally, or alternatively, a single network element may be implemented as multiple network elements in which a process or a function may be collaboratively performed or multiple processes or functions may be split between them. For example, program encoder 215 may be implemented as multiple network elements, such as, for example, a segmenter that divides a program into segments or chunks, and a program presenter that generates a media presentation description (MPD).

As further illustrated, environment 200 includes a network interface device 230 and user device 150. For example, these end user elements may be implemented as customer premise devices. According to other exemplary implementations, additional, fewer, and/or different end user elements than those illustrated in FIG. 2A may be used. For example, network interface device 230 may be omitted. User device 150 is operated by a user 232.

Communication links 160 illustrated in FIG. 2A are exemplary. Communication link 160 between the network elements or between the network element and an end user element may be direct or indirect. For example, an indirect communication link 160 may include an intermediary device and/or intermediary network that is/are not illustrated in FIG. 2A.

Figure 2B:
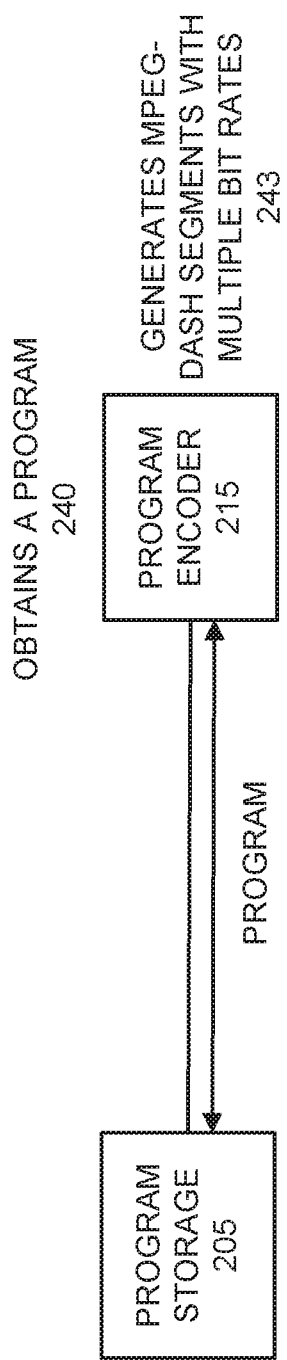
FIGS. 2B-2F are diagrams illustrating an exemplary process of the multicast service provided by the network elements.

Referring to FIG. 2B, according to an exemplary scenario, assume that program storage 205 stores a program 251 that is to be multicasted. For example, assume that the program is a movie. Program encoder 215 obtains the program 240. For example, program encoder 215 may obtain the program via a push method or a pull method. The program may be the entire program or a portion of the program. In response to obtaining the program, program encoder 215 generates MPEG-DASH segments with multiple bit rates 243. For example, program encoder 215 may include logic that segments the program into transport stream (ts) files each of which has a particular duration (e.g., 2 seconds, 3 seconds, etc.) and a particular bitrate (e.g., 256,000 bits/second, 496,000 bits/second, etc.). Program encoder 215 may segment the program based on the maximum transmission unit supported by a multicast channel. Program encoder 215 may include logic that performs other transcoding operations based on various criteria, such as aspect ratio, language, compression, or other well-known factor.

Figure 2C:
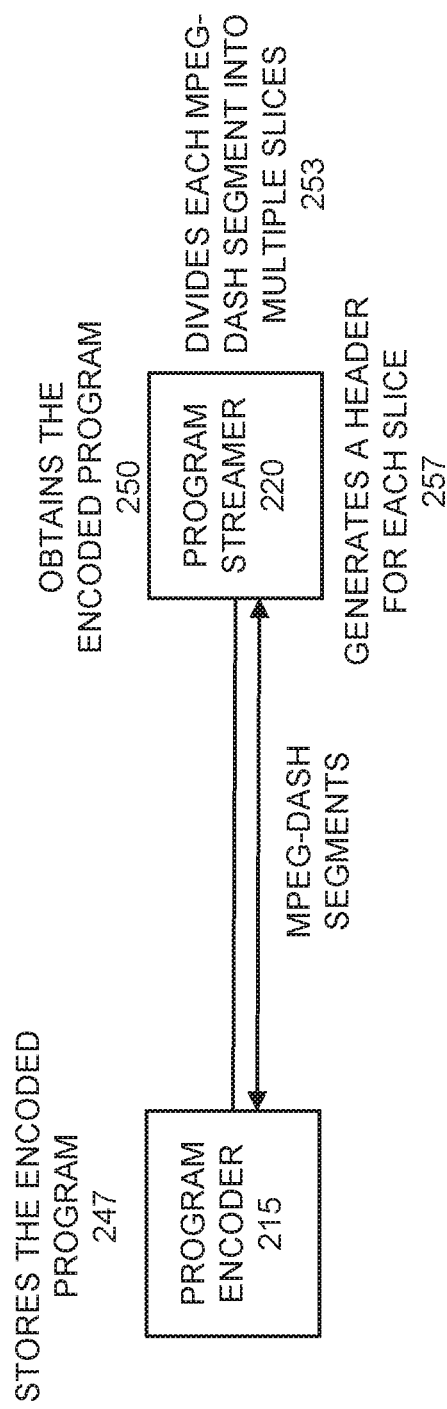

Referring to FIG. 2C, program encoder 215 stores the encoded program 247. Program streamer 220 obtains the encoded program 250 from program encoder 215. For example, program streamer 220 may obtain the MPEG-DASH segments 261 via a push method or a pull method. When a unicast protocol is used to transmit the MPEG-DASH segments (e.g., using HTTP) from encoder program 250, program streamer 220 may discard the protocol data (e.g., HTTP data) since program streamer 220 includes logic that streams the MPEG-DASH segments using a multicast protocol stack, as described herein. In response to receiving the MPEG-DASH segments, program streamer 220 includes logic that divides each of the MPEG-DASH segments into multiple slices 253.

Program streamer 220 also includes logic that generates a header for each slice 257. For example, the header includes sequence information (e.g., a sequence number or other type of indicator that represents placement in a consecutive sequence) so that a consecutive ordering of the slices can be determined. The header may also include other information pertaining to the program and/or the MPEG-DASH segment, as previously described. The header and the slice may be of a size that fits in a protocol packet (e.g., given a size associated with a maximum transmission unit of the protocol packet). According to an exemplary implementation, the protocol packet includes a UDP packet.

Program streamer 220 may include logic that adds forward error correction data to the protocol packets that are to be multicasted. In this way, when present, an intermediary device and/or an intermediary network (not illustrated) that resides between program streamer 220 and forward error corrector 225, may perform error detection and correction to the packets being multicasted before the packets are received by forward error corrector 225. Program streamer 220 includes logic that adds a Multicast header (e.g., a UDP Multicast header) to the protocol packet (e.g., the UDP packet).

Figure 2D:
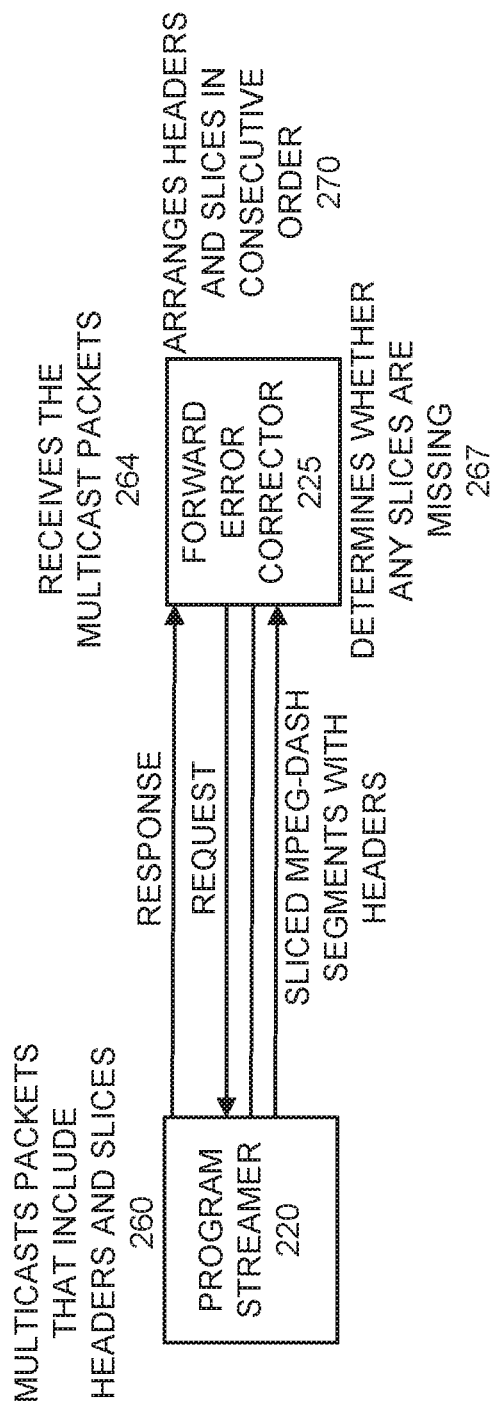

Referring to FIG. 2D, program streamer 220 includes logic that multicasts the packets that include the headers and the slices 260. Forward error corrector 225 receives the multicast packets 264. Forward error corrector 225 determines whether any slices are missing 267. For example, forward error corrector 225 may determine whether any slices are missing based on the sequence information included in the headers carried by the packets received. In the event that a slice is missing, forward error corrector 225 may generate a request to obtain the missing header and the missing slice, or the missing slice. The request may carry data indicating the missing header and the missing slice or, the missing slice. The request may also include other data (e.g., a program identifier of the program being multicasted, etc.).

As illustrated in FIG. 2D, according to an exemplary implementation, forward error corrector 225 transmits the request to program streamer 220. In response to receiving the request, program streamer 220 identifies the missing header and the missing slice, or the missing slice based on the data included in the request. Program streamer 220 generates a response that includes the missing header and the missing slice, or the missing slice. Program streamer 220 transmits the response to forward error corrector 225. For example, program streamer 220 may unicast the response to forward error corrector 225. When the response is received, forward error corrector 225 includes logic that stores the missing header and the missing slice.

Alternatively, for example, when only the missing slice is requested, forward error corrector 225 includes logic that generates the missing header, and stores the missing header and the missing slice. Forward error corrector 225 may then arrange the headers and the slices in consecutive order 270 and reassembles the MPEG-DASH segments. In the event that forward error corrector 225 determines that no slices are missing, forward error corrector 225 arranges the headers and the slices in consecutive order, as previously mentioned, and reassembles the MPEG-DASH segments.

Figure 2E:
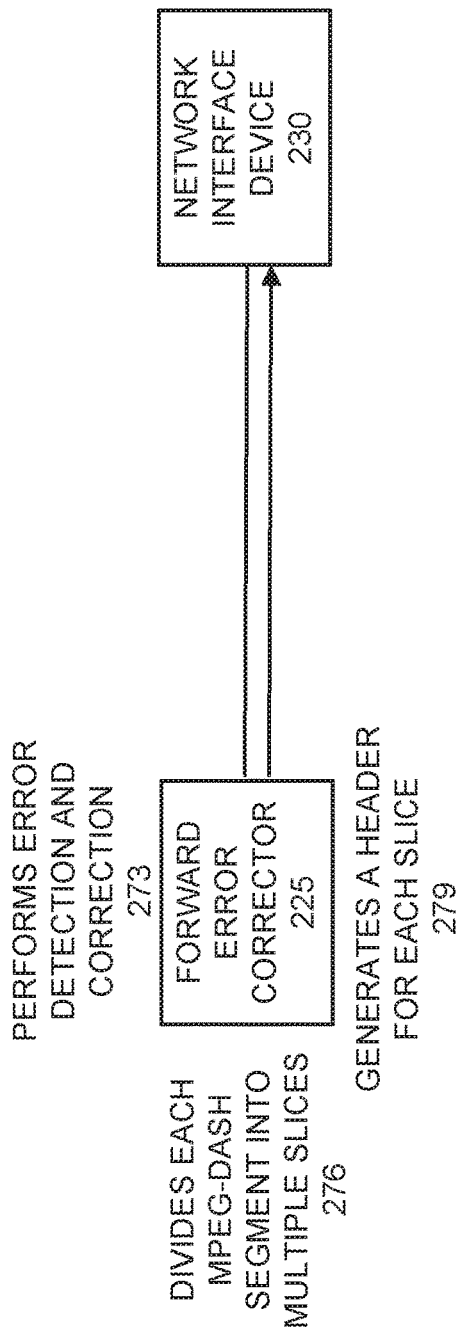

Referring to FIG. 2E, according to this example, forward error corrector 225 performs error detection and correction 273 on the assembled MPEG-DASH segments carried in the received packets. According to this example, assume that no errors or uncorrectable errors exist, and forward error corrector 225 stores the assembled MPEG-DASH segments in temporary storage (e.g., in a buffer, a cache, etc.). Forward error corrector 225 includes logic that divides each of the MPEG-DASH segments into multiple slices 276 and generates a header for each slice 279 in a manner previously described in relation to FIG. 2C, as performed by program encoder 215. Forward error corrector 225 includes logic that generates the packets based on the headers and the slices.

Figure 2F:
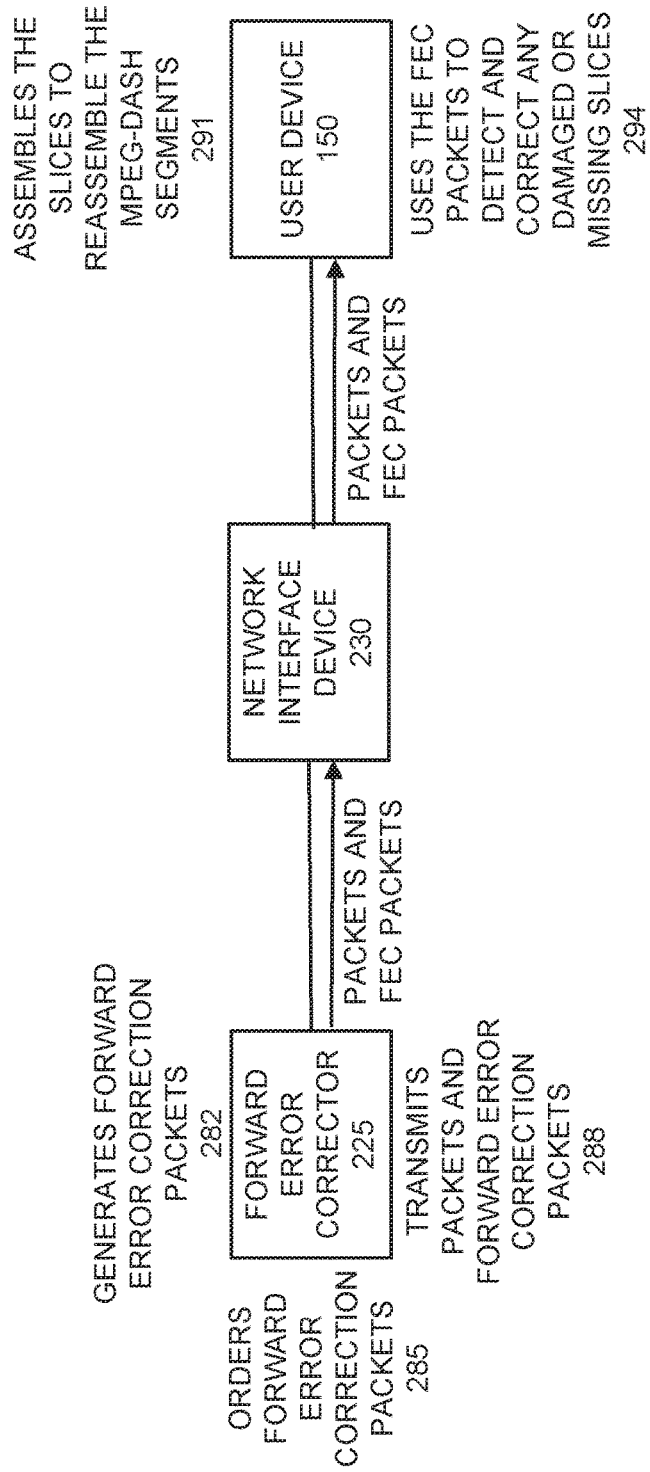

Referring to FIG. 2F, forward error corrector 225 uses the packets to generate forward error correction packets 282. According to an exemplary implementation, forward error corrector 225 selects a group of packets P that are consecutively and sequentially ordered. According to an exemplary implementation the value of P is an even number. Forward error corrector 225 divides the group of packets P into S sub-groups or stripes of packets. For example, referring to FIG. 1B, each stripe may include packets that are nonconsecutive and equally spaced numerically by the value of S, where S=20 (e.g., packet 1, packet 21, packet 41, packet 61, in which packet 1 and packet 21 are spaced numerically by 20, etc.). Each stripe may or may not have the same number of packets. For example, while the value P may be implemented as an even number, when only an odd number of packets are available, one or multiple stripes may have a different number of packets relative to another stripe. Forward error corrector 225 uses each stripe to generate FEC packets pertaining to those packets included in the stripe. The number of FEC packets for each stripe may be the same or different depending on whether the number of packets in each stripe is the same or different. Also, the number of FEC packets generated for the group of packets P may be based on the amount of overhead that can be tolerated.

Referring back to FIG. 2F, forward error corrector 225 includes a forward error correction encoder that has logic to encode the packets included in each stripe. For example, the forward error correction encoder may use an error detection code (e.g., a parity check code, an arithmetic redundancy check (ARC) code, a cyclic redundancy check (CRC) code), a correction code (e.g., a block code, a convolution code), a concatenated error code, and/or other type of forward error control code. Forward error corrector 225 generates FEC packets for each stripe based on the code(s) and the program data included in the packets of the stripe.

Forward error corrector 225 may order or assign a sequence to the forward error correction packets 285. For example, referring to FIG. 1C, according to an exemplary implementation, a consecutive ordering of the FEC packets pertaining to the group of packets P is such that an FEC packet from each stripe is selected, in an order of the stripes, to form the consecutive sequential order (e.g., FEC packets 1-20). This process may repeat depending on the number of FEC packets generated (e.g., FEC packets 21-40, etc.).

In response to the generation and the ordering of the FEC packets, forward error corrector 225 places the packets and the FEC packets in protocol packets, and transmits (e.g., multicasts) the protocol packets, which include the headers and the slices, followed by the FEC packets to user device 150 via network interface device 230, as a part of the multicast session. According to this example, assume that network interface device 230 is implemented as a customer premise device, such as a wireless router of a local area network (LAN) at a location of user 232. Also, according to this example, assume that user device 150 is implemented as a set top box. According to such an example, there may be an intermediary device and/or an intermediary network between forward error corrector 225 and network interface device 230 that is not illustrated for purposes of brevity. Nevertheless, upon receipt of the packets and the FEC packets, network interface device 230 transmits the packets and the FEC packets to user device 150. Network interface device 230 and user device 150 may use a multicast protocol. For example, these devices may use a light version of the Pragmatic General Multicast (PGM) Protocol so that the packets and the FEC packets are protected over the link established between network interface device 230 and user device 150.

In response to receiving the packets and the FEC packets, user device 150 includes logic that reassembles the MPEG-DASH segments 291, and uses the FEC packets to detect and correct any damaged or missing slices 294. A further description of this process is described.

Figure 3A:
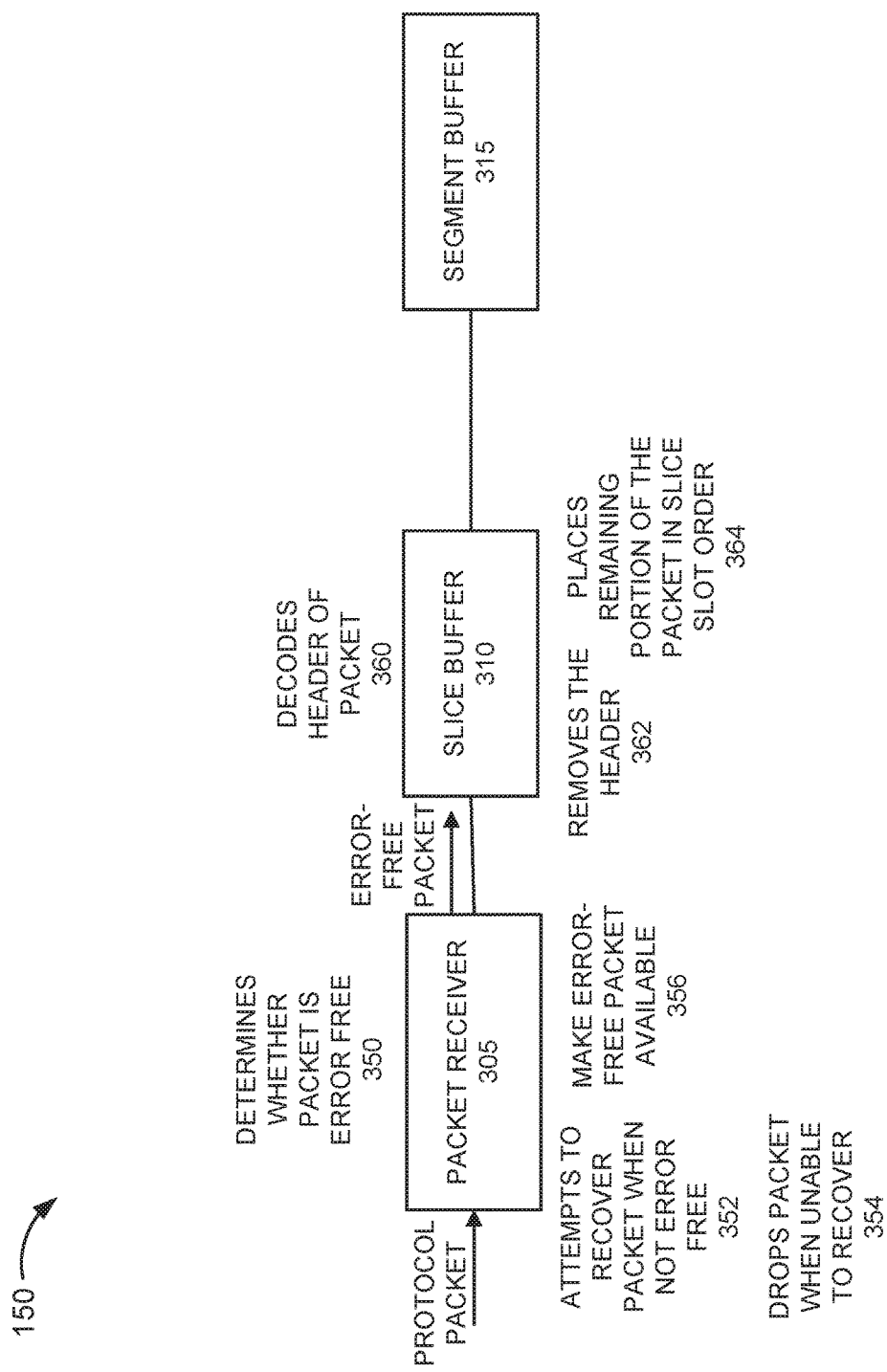
FIGS. 3A-3C are diagrams illustrating an exemplary process of an exemplary embodiment of the forward error correction service performed by a user device.
Figure 3B:
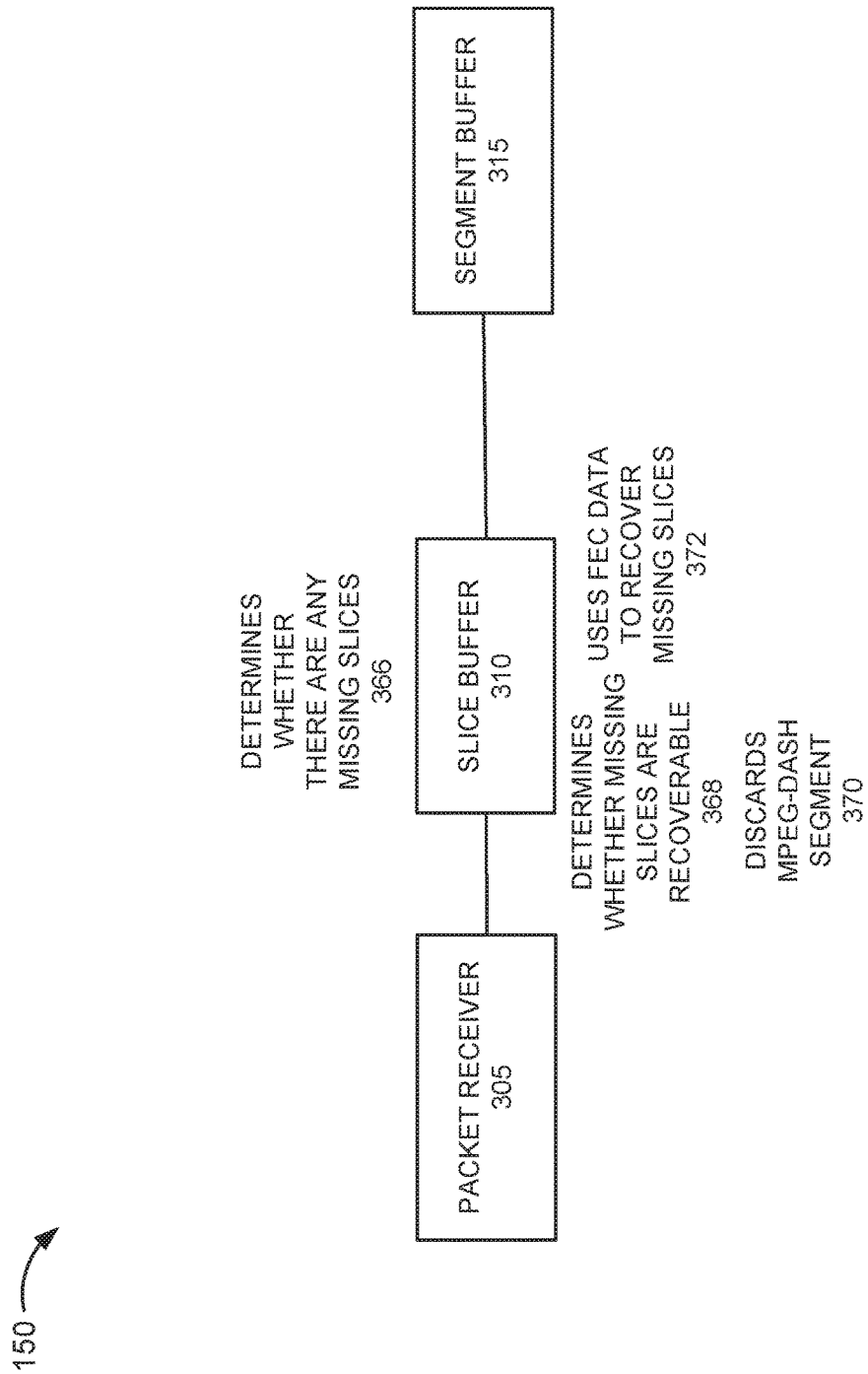
Figure 3C:
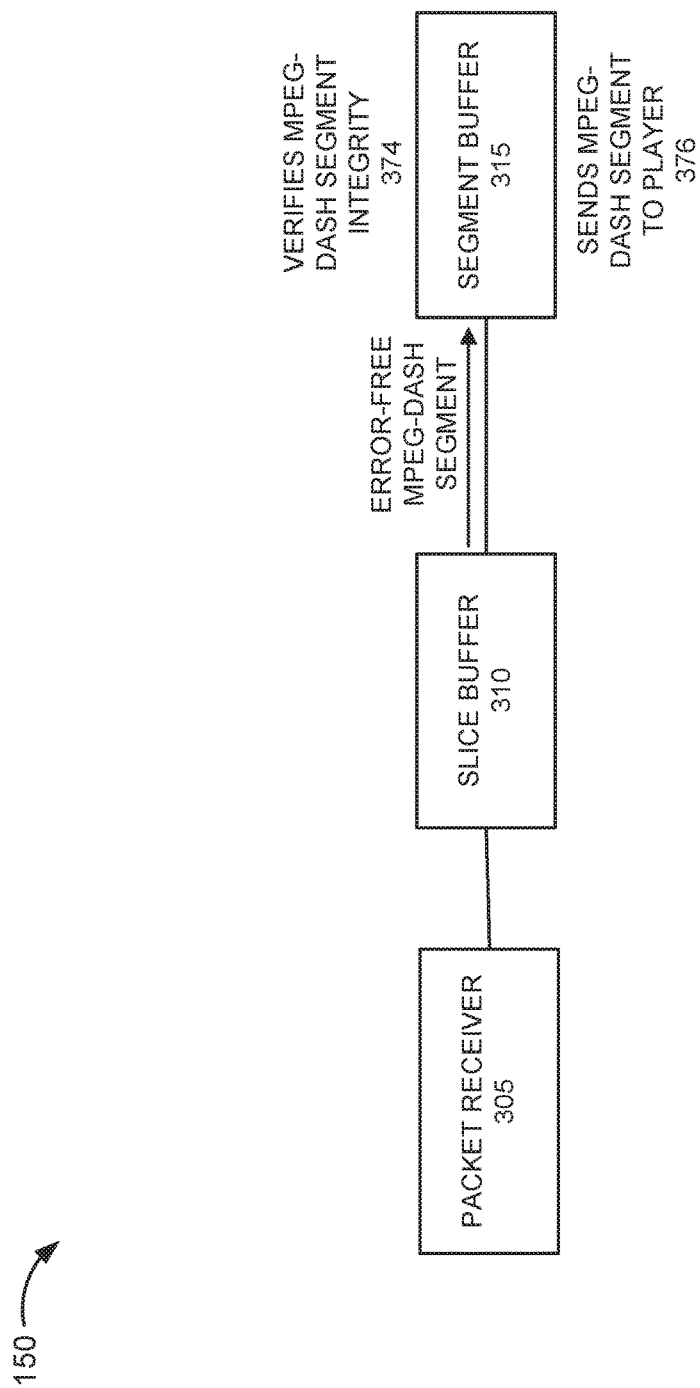

FIGS. 3A-3C are diagrams illustrating an exemplary process of an exemplary embodiment of the forward error correction service performed by user device 150. According to an exemplary implementation, as illustrated, user device 150 includes a packet receiver 305, a slice buffer 310, and a segment buffer 315. Packet receiver 305, slice buffer 310, and segment buffer 315 include logic that provides the forward error correction service. According to other exemplary implementations, user device 150 may include additional, fewer, and/or different elements that are configured to provide the forward error correction service, as described herein.

Referring to FIG. 3A, assume that user device 150 receives a protocol packet included in the multicast transmission of the program. In response, packet receiver 305 determines whether the protocol packet includes an error 350. For example, the protocol packet may be a UDP packet. Packet receiver 350 may use the checksum field included in the UDP header to determine whether the UDP packet is error-free or not. When the packet receiver 305 determines that the protocol packet includes an error, packet receiver 305 attempts to recover the protocol packet 352. For example, packet receiver 305 may communicate with network interface device 230 and/or forward error corrector 225 using the light version of the PGM protocol to obtain the protocol packet. For example, packet receiver 305 may generate a request that identifies the protocol packet to be obtained. If the protocol packet cannot be obtained, packet receiver 305 may drop the protocol packet 354. When the packet receiver 305 determines that the protocol packet does not include an error or another protocol packet is obtained, packet receiver 305 makes the error-free protocol packet available 356 to slice buffer 310.

Slice buffer 310 includes logic that decodes the header of the packet 360. For example, slice buffer 310 decapsulates the header and the slice from the protocol packet, and uses the header to identify the sequence of the slice. Slice buffer 310 may also use the header to identify other information (e.g., the program, the MPEG-DASH segment). Slice buffer 310 removes the header 362 and places (e.g., in a buffer) the remaining portion of the packet (e.g., the slice) in slice slot order 364.

Referring to FIG. 3B, according to this exemplary scenario, assume that slice buffer 310 receives slices associated with an MPEG-DASH segment and the corresponding FEC packet data. As illustrated, slice buffer 310 determines whether there are any missing slices 366. According to an exemplary implementation, slice buffer 366 may determine whether there are any missing slices on a per stripe basis based on the sequential ordering of the slices. When slice buffer 310 determines that there are not any missing slices, the recovery and reconstruction process of the forward error correction service may continue to processes described in relation to FIG. 3C, as described further below.

When slice buffer 310 determines that there are missing slices, slice buffer 310 determines whether the missing slices are recoverable 368. For example, as previously described, according to an exemplary embodiment, slice buffer 310 may determine the number of missing slices for a stripe and compares that number to the number of FEC packets associated with the stripe (e.g., compares the value of F to the number of missing slices). When the number of missing slices, in the stripe, exceeds the number of FEC packets associated with that stripe, slice buffer 310 may determine that the stripe is not recoverable. However, when the number of missing slices, in the stripe, is equal to or less than the number of F FEC packets associated with that stripe, slice buffer 310 may determine that the stripe is recoverable.

According to an exemplary implementation, slice buffer 310 may store one or multiple of the variables P, S, Q, V, and F and the values associated with these variables and use the variable(s)/value(s) to make such determinations. User device 150 may receive updates from network 105 when the value of a variable changes. For example, as previously described, the values of variables P, S, Q, V, and F may be static or dynamic. Additionally, when the value of F or another variable (e.g., Q etc.) is different for different stripes or different MPEG-DASH segments, slice buffer 310 may store multiple values for such variable.

Slice buffer 310 may determine whether the missing slices are recoverable for each stripe or until a stripe is encountered that is determined to be not recoverable. According to an exemplary implementation, when slice buffer 310 determines that one or multiple stripes are not recoverable, slice buffer 310 may discard the MPEG-DASH segment 370. That is, all of the stripes of the MPEG-DASH segment may be discarded. However, when slice buffer 310 determines that one or multiple stripes have missing slices, and that the missing slices are recoverable, slice buffer 310 uses the FEC data to recover the missing slices 372 for each stripe. As previously described, according to an exemplary embodiment, slice buffer 310 may select a number of FEC packets equal to the number of missing slices in the stripe to be able to recover the missing slices.

Referring to FIG. 3C, slice buffer 310 may make available all of the stripes, which include all of the slices of an MPEG-DASH segment, to segment buffer 315. Segment buffer 374 includes logic that verifies the data integrity of the MPEG-DASH segment. For example, segment buffer 315 may use a data integrity algorithm to verify the number of bytes, bits, etc., of the MPEG-DASH segment. According to this exemplary scenario, assume that no data integrity issues exist, and segment buffer 315 sends the MPEG-DASH segment to a program player 376. The program player plays the received MPEG-DASH segment of the program.

Figure 4:
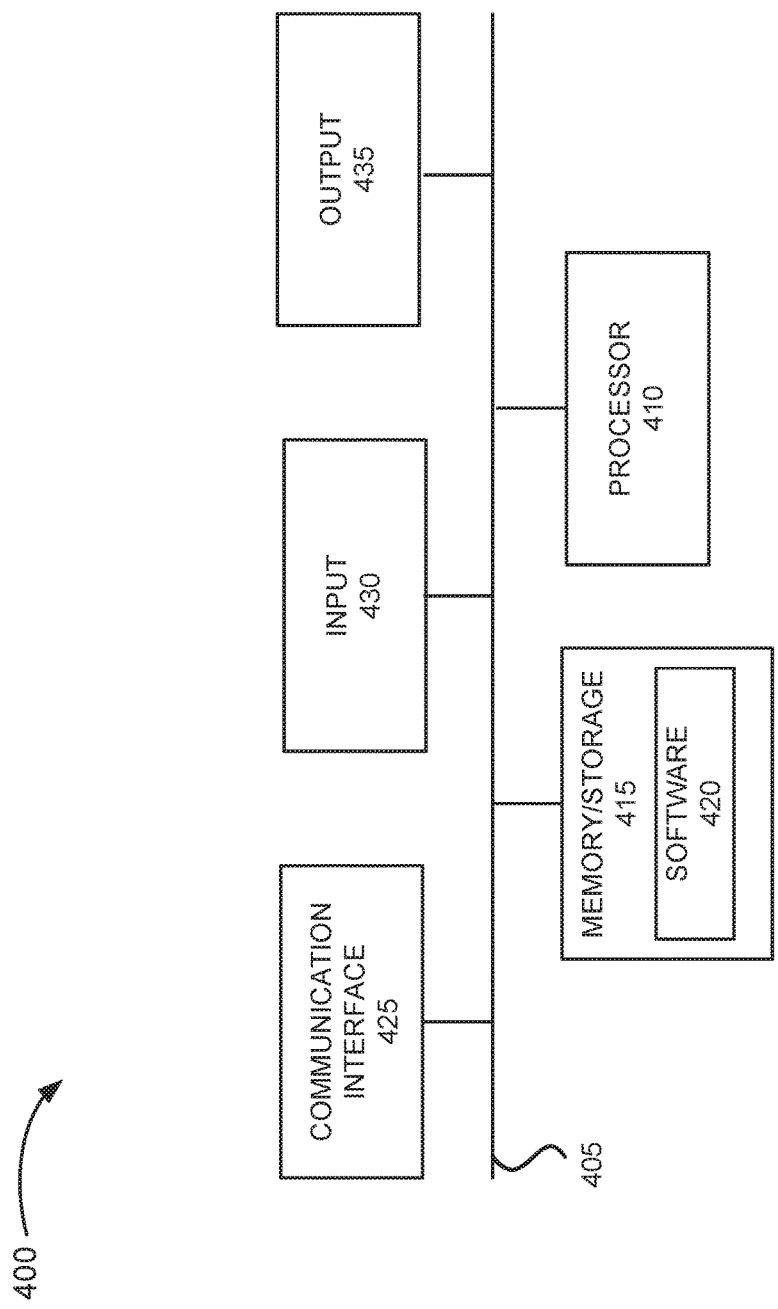
FIG. 4 is a diagram illustrating exemplary components of a device that may correspond to network devices and the user device depicted in FIG. 1A.

FIG. 4 is a diagram illustrating exemplary components of a device 400 that may correspond to one or more of the devices described herein. For example, device 400 may correspond to components included in network device 110, user device 150, and network interface device 230. Additionally, the exemplary network elements (e.g., program storage 205, program encoder 215, program streamer 220, and forward error corrector 225) may be implemented based on the components described. Also, the exemplary elements (e.g., packet receiver 305, slice buffer 310, and segment buffer 315) may be implemented based on the components described. As illustrated in FIG. 4, according to an exemplary embodiment, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, and/or clocks.

Processor 410 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc. Processor 410 may be a dedicated component or a non-dedicated component (e.g., a shared resource).

Processor 410 may control the overall operation or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, etc.

Memory/storage 415 includes one or multiple memories and/or one or multiple other types of storage mediums. For example, memory/storage 415 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory (e.g., a NAND flash, a NOR flash, etc.), and/or some other type of memory. Memory/storage 415 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 415 may include a drive for reading from and writing to the storage medium.

Memory/storage 415 may be external to and/or removable from device 400, such as, for example, a Universal Serial Bus (USB) memory stick, a dongle, a hard disk, mass storage, off-line storage, network attached storage (NAS), or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. Software 420 may include an operating system. Software 420 may also include firmware, middleware, microcode, hardware description language (HDL), and/or other form of instruction. By way of example, with respect to network devices 110 and the network elements, the logic that provides the forward error correction service may be implemented to include software 420. Additionally, for example, user device 150 may include logic that provides the forward error correction service, as described herein, based on software 420.

Communication interface 425 permits device 400 to communicate with other devices, networks, systems, devices, and/or the like. Communication interface 425 includes one or multiple wireless interfaces and/or wired interfaces. For example, communication interface 425 may include one or multiple transmitters and receivers, or transceivers. Communication interface 425 may include an antenna. Communication interface 425 may operate according to a protocol stack and a communication standard. Communication interface 425 may include various processing logic or circuitry (e.g., multiplexing/de-multiplexing, filtering, amplifying, converting, error correction, etc.).

Input 430 permits an input into device 400. For example, input 430 may include a keyboard, a mouse, a display, a button, a switch, an input port, speech recognition logic, a biometric mechanism, a microphone, a visual and/or audio capturing device (e.g., a camera, etc.), and/or some other type of visual, auditory, tactile, etc., input component. Output 435 permits an output from device 400. For example, output 435 may include a speaker, a display, a light, an output port, and/or some other type of visual, auditory, tactile, etc., output component. According to some embodiments, input 430 and/or output 435 may be a device that is attachable to and removable from device 400.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a process described herein. Alternatively, for example, according to other implementations, device 400 performs a process described herein based on the execution of hardware (processor 410, etc.).

Figure 5A:
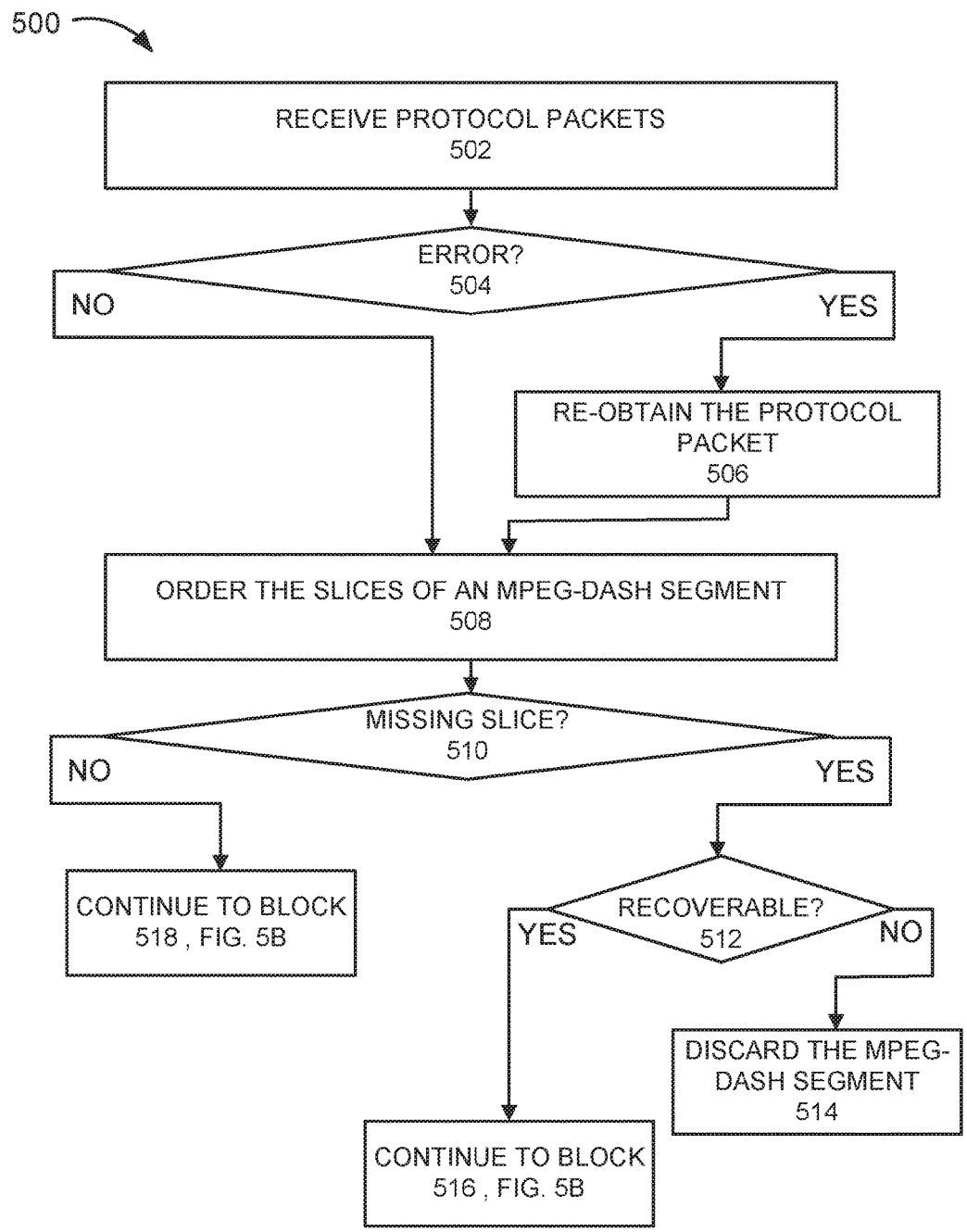
FIGS. 5A and 5B are flow diagrams illustrating an exemplary process of the forward error correction service performed by the user device.
Figure 5B:
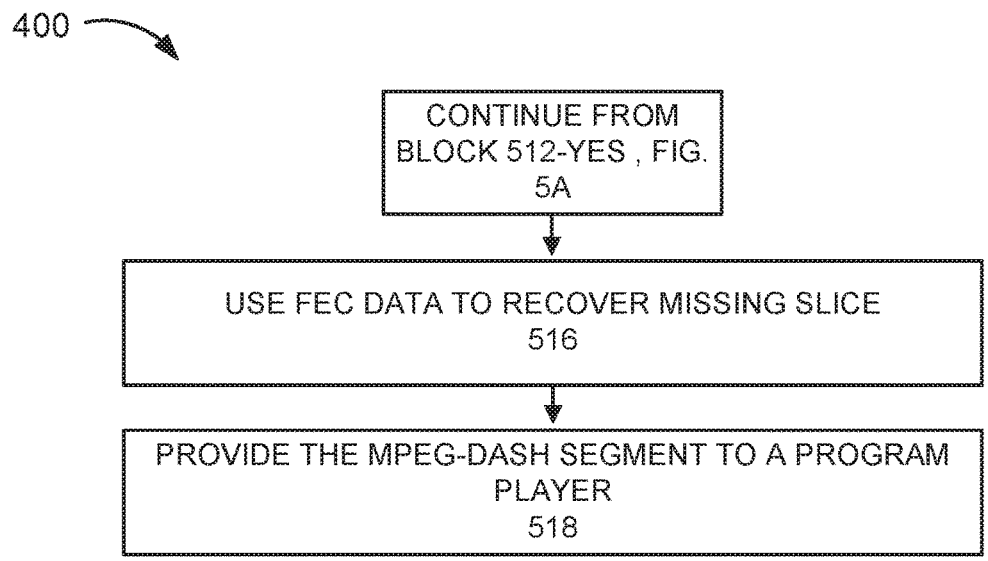

FIGS. 5A and 5B are flow diagrams illustrating an exemplary process 500 pertaining to the forward error correction service. Process 500 is directed to processes previously described with respect to FIGS. 3A-3C and elsewhere in this detailed description pertaining to the forward error correction service. According to an exemplary embodiment, user device 150 performs the steps of process 500. For example, processor 410 executes software 420 to perform the steps described.

Referring to FIG. 5A, in block 502, process 500 may begin with receiving protocol packets. For example, packet receiver 305 may receive UDP packets carrying packets (e.g., headers and slices of an MPEG-DASH segment) and FEC packets.

In block 504, it is determined whether the protocol packet includes an error. For example, packet receiver 305 determines whether the UDP packet includes an error based on a checksum field included in the UDP header. When it is determined that the protocol packet includes the error (block 504—YES), another protocol packet may be obtained (block 506). For example, user device 150 may generate and transmit a request to an upstream device (e.g., forward error corrector 225, network interface device 230) for another copy of the UDP packet. In response to receiving the request, the upstream device retransmits the protocol packet, and process 500 may return to block 505. When an error-free protocol packet cannot be obtained, packet receiver 305 may drop the erred protocol packet.

When it is determined that the protocol packet does not include the error (block 504-NO), process 500 may continue to block 508. In block 508, the slices of an MPEG-DASH segment are ordered. For example, slice buffer 310 places the slices in sequential order based on the sequence information included in the headers. Slice buffer 310 may discard the headers after the slices are place in sequential order. In block 510, it is determined whether there are any missing slices. For example, slice buffer 310 may determine whether there are any missing slices on a per stripe basis based on the sequential ordering of the slices.

When it is determined that there are missing slices (block 510—YES), it is determined whether the missing slices are recoverable (block 512). For example, slice buffer 310 may determine the number of missing slices for a stripe and compares that number to the number of FEC packets associated with the stripe (e.g., compares the value of F to the number of missing slices). When the number of missing slices in the stripe exceeds the number of FEC packets associated with that stripe, slice buffer 310 may determine that the stripe is not recoverable. However, when the number of missing slices, in the stripe, is equal to or less than the number of FEC packets associated with that stripe, slice buffer 310 may determine that the stripe is recoverable. Alternatively, slice buffer 310 may notify packet receiver 310 to re-obtain the packet that includes the missing slice.

When it is determined that the missing slices are not recoverable (block 512-NO), the MPEG-DASH segment may be discarded (block 514). For example, slice buffer 310 may discard all the stripes of slices corresponding to the MPEG-DASH segment. According to another example, slice buffer 310 may compare a missing slice error signature of the MPEG-DASH segment to missing slice error signature information stored at user device 150. For example, the missing slice error signature information may indicate threshold values indicative of when to discard or keep an MPEG-DASH segment. Also, the playing of the MPEG-DASH segment that includes missing errors that cannot be recovered may suffer from audio and/or video degradations. When it is determined that the missing slices are recoverable (block 512—YES), the process continues to block 516 depicted in FIG. 5B.

In block 516, the FEC data is used to recover the missing slices. For example, slice buffer 310 uses the FEC data belonging to each stripe to recover any missing slices of the stripe.

In block 518, the MPEG-DASH segment is provided to a program player. For example, segment buffer 315 may verify the data integrity of the MPEG-segment. In response to successfully verifying the MPEG-segment, segment buffer 315 provides the MPEG-segment to a program player of user device. Referring back to FIG. 5A, when it is determined that there are not missing slices (block 510-NO), the process continues to block 518, as described above.

Although FIGS. 5A and 5B illustrate an exemplary process of a forward error correction service, according to other embodiments, process 500 may include additional operations, fewer operations, and/or different operations than those illustrated in FIGS. 5A and 5B, and as described herein. According an exemplary embodiment, user device 150 may store one or multiple of the variables P, S, Q, V, and F and the values associated with these variables, and use the variable(s)/value(s) to perform one or multiple operations of process 500.

Figure 6:
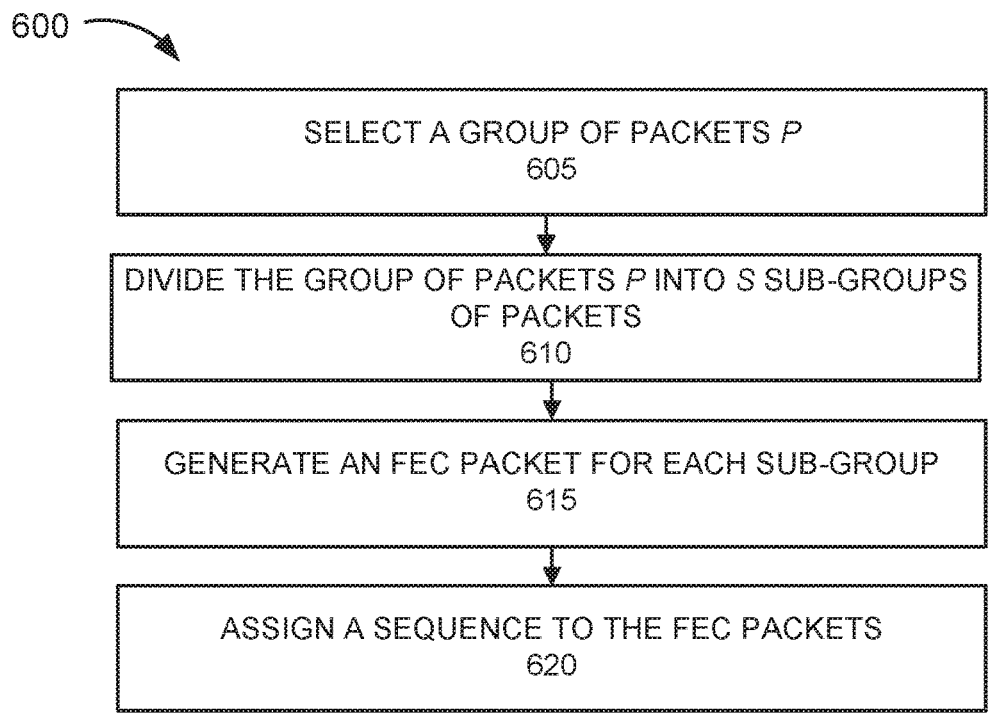
FIG. 6 is a flow diagram illustrating an exemplary process of a forward error correction service included in the multicast service.

FIG. 6 is a flow diagram illustrating an exemplary process 600 pertaining to the multicast service. Process 600 is directed to a process previously described with respect to FIGS. 1B, 1C, and 2E as well as elsewhere in this detailed description. According to an exemplary embodiment, forward error corrector 225 performs the steps of process 600. For example, processor 410 executes software 420 to perform the steps described.

Referring to process 600, in block 605, a group of packets P is selected. For example, packets that include the headers and the slices pertaining to the MPEG-DASH segments of a program are selected. Additionally, as previously described, the group of packets P is a consecutively and sequentially ordered set of packets. According to an exemplary implementation, the value of P is an even number.

In block 610, the group of packets P is divided into S sub-group of packets. For example, each stripe may include packets that are not consecutive and sequential. By way of further example, each packet of within sub-group may be equally spaced apart numerically, in terms of sequence, by the value of S, which forms a new sequence of packets that are not (immediately) consecutive. Each stripe may or may not have the same number of packets.

In block 615, a forward error correction packet is generated for each sub-group of packets. For example, the forward error correction encoder may use an error detection code (e.g., a parity check code, an ARC code, a CRC code), a correction code (e.g., a block code, a convolution code), a concatenated error code (e.g., Reed-Solomon/Viterbi algorithm), and/or other type of forward error control code. Forward error corrector 225 generates a forward error packet for each stripe based on the code(s) and the program data included in the packets of the stripe.

In block 620, a sequence to the forward error correction packets is assigned. For example, according to an exemplary implementation, the sequence of the FEC packets is such that an FEC packet from each stripe is selected, in an order of the stripes, to form a consecutive sequential order (e.g., FEC packets 1-20). This process may repeat depending on the number of FEC packets generated (e.g., FEC packets 21-40, etc.).

Although FIG. 6 illustrates an exemplary process pertaining to the multicast system, according to other embodiments, process 600 may include additional operations, fewer operations, and/or different operations than those illustrated in FIG. 6, and as described herein.

The foregoing description of embodiments provides illustration, but is not intended to be exhaustive or to limit the embodiments to the precise form disclosed. Accordingly, modifications to the embodiments described herein may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The term "exemplary," as used herein means "serving as an example." Any embodiment or implementation described as "exemplary" is not necessarily to be construed as preferred or advantageous over other embodiments or implementations.

In addition, while series of blocks have been described with regard to the processes illustrated in FIGS. 5A, 5B, and 6, the order of the blocks may be modified according to other embodiments. Further, non-dependent blocks may be performed in parallel or simultaneously. For example, according to an exemplary implementation, two or more operations may be performed using parallel processing or a multitasking procedure. Additionally, other processes described in this description may be modified and/or non-dependent operations may be performed in parallel or simultaneously.

The embodiments described herein may be implemented in many different forms of software executed by hardware. For example, a process or a function may be implemented as "logic" or as a "component." The logic or the component may include, for example, hardware (e.g., processor 410), or a combination of hardware and software (e.g., software 420). The embodiments have been described without reference to the specific software code since the software code can be designed to implement the embodiments based on the description herein and commercially available software design environments/languages.

In the description and illustrated by the drawings, reference is made to "an exemplary embodiment," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

Additionally, embodiments described herein may be implemented as a non-transitory storage medium that stores data and/or information, such as instructions, program code, a computer program, software, a software application, a data structure, a program module, an application, machine code, a file that can be executed using an interpreter, etc. The program code, instructions, application, etc., is readable and executable by a processor (e.g., processor 410) of a computational device. A non-transitory storage medium includes one or more of the storage mediums described in relation to memory/storage 415.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction described in the description or illustrated in the drawings should be construed as critical or essential to the embodiments described herein unless explicitly described as such.

What is claimed is:

1. A method comprising:
    receiving, by a user device, multicast protocol packets, wherein each of the multicast protocol packets includes one of:
        a slice of program data of a Moving Picture Experts Group (MPEG) Dynamic Adaptive Streaming over Hypertext Transfer Protocol (HTTP) (MPEG-DASH) segment pertaining to a program, and a header of the slice that includes sequence information of the slice relative to other slices, or
        forward error correction data, wherein at least one of the multicast protocol packets includes the forward error correction data, and wherein at least one of the multicast protocol packets includes the slice of program data and the header of the slice;
    ordering, by the user device and in response to the receiving, each slice received based on the header;
    determining, by the user device, whether any slice is missing that is a part of the MPEG-DASH segment;
    determining, by the user device and in response to determining that there are missing slices, whether the missing slices can be recovered; and
    using, by the user device and in response to determining that the missing slices can be recovered, the forward error correction data to recover the missing slices.

2. The method of claim 1, wherein the MPEG-DASH segment is divided into P packets, wherein each packet of the P packets includes the slice and the header, and wherein P is a numerical value and each packet of the P packets is consecutively and sequentially ordered, wherein the P packets are divided into S sub-groups of packets, wherein S is a numerical value, and wherein each sub-group includes a sub-group of packets of the P packets and the sub-group of packets are not consecutively and sequentially ordered; and wherein a sub-group of forward error correction packets for each sub-group include a portion of the forward error correction data, and the portion of the forward error correction data is generated based on the sub-group of packets within each sub-group of S sub-groups.

3. The method of claim 2, wherein packets within each sub-group of S sub-groups are sequenced based on the numerical value of S, and wherein the header includes at least one of an identifier pertaining to the MPEG-DASH segment to which the slice belongs or an identifier of the program.

4. The method of claim 2, wherein determining whether the missing slices can be recovered further comprises:

identifying, by the user device, to which sub-group of packets the missing slices belong;

determining, by the user device and in response to the identifying, whether a number of packets that belong to the identified sub-group of packets and are missing from the identified sub-group is greater than a number of forward error correction packets belonging to a same identified sub-group of packets; and determining, by the user device, that the missing slices can be recovered in response to determining that the number of packets that belong to the identified sub-group of packets is equal to or less than the number of forward error correction packets belonging to the same identified sub-group of packets.

5. The method of claim 2, wherein determining whether the missing slices can be recovered further comprises:

identifying, by the user device, to which sub-group of packets the missing slices belong;

determining, by the user device and in response to the identifying, whether a number of packets that belong to the identified sub-group of packets and are missing from the identified sub-group is greater than a number of forward error correction packets belonging to a same identified sub-group of packets; and determining, by the user device, that the missing slices cannot be recovered in response to determining that the number of packets that belong to the identified sub-group of packets is greater than the number of forward error correction packets belonging to the same identified sub-group of packets.

6. The method of claim 5, further comprising:

discarding, by the user device and in response to determining that the missing slices cannot be recovered, all of the slices received in the multicast protocol packets.

7. The method of claim 1, further comprising:

determining, by the user device and in response to the receiving, whether any of the multicast protocol packets include an error; and requesting, by the user device and in response to determining that one or more of the multicast protocol packets include the error, another copy of the one or more of the multicast protocol packets from another device.

8. The method of claim 1, wherein the multicast protocol packets are User Datagram Protocol packets.

9. A user device comprising:
a communication interface,
a memory, wherein the memory stores software, and
a processor, wherein the processor executes the software to:

receive, via the communication interface, multicast protocol packets, wherein each of the multicast protocol packets includes one of:

a slice of program data of a Moving Picture Experts Group (MPEG) Dynamic Adaptive Streaming over Hypertext Transfer Protocol (HTTP) (MPEG-DASH) segment pertaining to a program, and a header of the slice that includes sequence information of the slice relative to other slices, or forward error correction data, wherein at least one of the multicast protocol packets includes the forward error correction data, and wherein at least one of the multicast protocol packets includes the slice of program data and the header of the slice;

order, in response to the receipt of the multicast protocol packets, each slice received based on the header;

determine whether any slice is missing that is a part of the MPEG-DASH segment;

determine, in response to a determination that there are missing slices, whether the missing slices can be recovered; and use, in response to a determination that the missing slices can be recovered, the forward error correction data to recover the missing slices.

10. The user device of claim 9, wherein the MPEG-DASH segment is divided into P packets, wherein each packet of the P packets includes the slice and the header, and wherein P is a numerical value and each packet of the P packets is consecutively and sequentially ordered, wherein the P packets are divided into S sub-groups of packets, wherein S is a numerical value, and wherein each sub-group includes a sub-group of packets of the P packets and the sub-group of packets are not consecutively and sequentially ordered; and wherein a sub-group of F forward error correction packets for each sub-group include a portion of the forward error correction data, wherein F is a numerical value, and the portion of the forward error correction data is generated based on the sub-group of packets within each sub-group of S sub-groups, and wherein the user device stores and uses the numerical values of P, S, and F.

11. The user device of claim 10, wherein packets within each sub-group of S sub-groups are sequenced based on the numerical value of S, and wherein the header includes at least one of an identifier pertaining to the MPEG-DASH segment to which the slice belongs or an identifier of the program.

12. The user device of claim 10, wherein the processor further executes the software to:

identify to which sub-group of packets the missing slices belong;

determine, in response to the identification of a sub-group, whether a number of packets that belong to the identified sub-group of packets and are missing from the identified sub-group is greater than a number of forward error correction packets belonging to a same identified sub-group of packets; and determine that the missing slices can be recovered in response to a determination that the number of packets that belong to the identified sub-group of packets is equal to or less than the number of forward error correction packets belonging to the same identified sub-group of packets.

13. The user device of claim 10, wherein the processor further executes the software to:
  identify to which sub-group of packets the missing slices belong;
  determine, in response to the identification of a sub-group, whether a number of packets that belong to the identified sub-group of packets and are missing from the identified sub-group is greater than a number of forward error correction packets belonging to a same identified sub-group of packets; and
  determine that the missing slices cannot be recovered in response to a determination that the number of packets that belong to the identified sub-group of packets is greater than the number of forward error correction packets belonging to the same identified sub-group of packets.

14. The user device of claim 13, wherein the processor further executes the software to:
  discard, in response to the determination that the missing slices cannot be recovered, all of the slices received in the multicast protocol packets.

15. The user device of claim 9, wherein the multicast protocol packets are User Datagram Protocol packets, and the header is not a header of a protocol packet.

16. A non-transitory computer-readable storage medium that stores instructions executable by a processor of a computational device, which when executed cause the computational device to:
  receive multicast protocol packets, wherein each of the multicast protocol packets includes one of:
    a slice of program data of a Moving Picture Experts Group (MPEG) Dynamic Adaptive Streaming over Hypertext Transfer Protocol (HTTP) (MPEG-DASH) segment pertaining to a program, and a header of the slice that includes sequence information of the slice relative to other slices, or
    forward error correction data, wherein at least one of the multicast protocol packets includes the forward error correction data, and wherein at least one of the multicast protocol packets includes the slice of program data and the header of the slice;
  order, in response to the receipt of the multicast protocol packets, each slice received based on the header;
  determine whether any slice is missing that is a part of the MPEG-DASH segment;
  determine, in response to a determination that there are missing slices, whether the missing slices can be recovered; and
  use, in response to a determination that the missing slices can be recovered, the forward error correction data to recover the missing slices.

17. The non-transitory, computer-readable storage medium of claim 16, wherein the MPEG-DASH segment is divided into P packets, wherein each packet of the P packets includes the slice and the header, and wherein P is a numerical value and each packet of the P packets is consecutively and sequentially ordered,
  wherein the P packets are divided into S sub-groups of packets, wherein S is a numerical value, and wherein each sub-group includes a sub-group of packets of the P packets and the sub-group of packets are not consecutively and sequentially ordered, and
  wherein a sub-group of F forward error correction packets for each sub-group include a portion of the forward error correction data, wherein F is a numerical value, and the portion of the forward error correction data is generated based on the sub-group of packets within each sub-group of S sub-groups, and wherein the computational device stores the numerical values of P, S, and F, and
  wherein the instructions further comprise instructions to:
  use the numerical values of P, S, and F.

18. The non-transitory, computer-readable storage medium of claim 17, wherein packets within each sub-group of S sub-groups are sequenced based on the numerical value of S, and wherein the header includes at least one of an identifier pertaining to the MPEG-DASH segment to which the slice belongs or an identifier of the program.

19. The non-transitory, computer-readable storage medium of claim 17, wherein the instructions to provide further comprise instructions to:
  identify to which sub-group of packets the missing slices belong;
  determine, in response to the identification of a sub-group, whether a number of packets that belong to the identified sub-group of packets and are missing from the identified sub-group is greater than a number of forward error correction packets belonging to a same identified sub-group of packets;
  determine that the missing slices can be recovered in response to a determination that the number of packets that belong to the identified sub-group of packets is equal to or less than the number of forward error correction packets belonging to the same identified sub-group of packets; and
  determine that the missing slices cannot be recovered in response to a determination that the number of packets that belong to the identified sub-group of packets is greater than the number of forward error correction packets belonging to the same identified sub-group of packets.

20. The non-transitory, computer-readable storage medium of claim 16, wherein the multicast protocol packets are User Datagram Protocol packets.

* * * * *